United States Patent
Fitz et al.

(10) Patent No.: US 11,363,539 B1
(45) Date of Patent: Jun. 14, 2022

(54) ADAPTIVE POWER CONTROL FOR MOBILE AD-HOC NETWORKS

(71) Applicant: SILVUS TECHNOLOGIES, INC., Los Angeles, CA (US)

(72) Inventors: Michael Paul Fitz, Los Angeles, CA (US); Moein Sadeghi, Los Angeles, CA (US)

(73) Assignee: SILVUS TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/111,367

(22) Filed: Dec. 3, 2020

Related U.S. Application Data

(60) Provisional application No. 62/943,645, filed on Dec. 4, 2019.

(51) Int. Cl.
*H04W 52/34* (2009.01)
*H04L 1/00* (2006.01)
*H04W 52/38* (2009.01)
*H04W 52/24* (2009.01)

(52) U.S. Cl.
CPC ......... *H04W 52/343* (2013.01); *H04L 1/0003* (2013.01); *H04L 1/0009* (2013.01); *H04W 52/241* (2013.01); *H04W 52/383* (2013.01)

(58) Field of Classification Search
CPC ... H04W 80/02; H04W 24/10; H04W 52/343; H04L 1/0003
USPC .......................... 455/41.1, 41.2, 41.3, 522, 69
See application file for complete search history.

(56) References Cited

U.S. PATENT DOCUMENTS

| | | | | |
|---|---|---|---|---|
| 6,128,295 | A * | 10/2000 | Larsson | H04L 49/203 370/389 |
| 2012/0114331 | A1* | 5/2012 | Kamijo | H04Q 11/0067 398/35 |
| 2016/0081575 | A1* | 3/2016 | Wu | G16H 20/17 600/301 |
| 2021/0195683 | A1* | 6/2021 | Xin | H04W 4/80 |

OTHER PUBLICATIONS

Chevillat, et al., "Dynamic Data Rate and Transmit Power Adjustment in IEEE 802.11 Wireless LANs," Int J Wireless Inf Networks 12, 123-145 (2005).
Holland, et al., "A Rate-Adaptive MAC Protocol for Multi-Hop Wireless Networks," In Proceedings of the 7th annual international conference on Mobile computing and networking (MobiCom '01). Association for Computing Machinery, New York, NY, USA, 236-251.
Qiao, et al., "Goodput enhancement of IEEE 802.11 a wireless LAN via link adaptation," ICC 2001. IEEE International Conference on Communications. Conference Record (Cat. No.01CH37240), Helsinki, Finland, pp. 1995-2000 vol. 7, 2001.

* cited by examiner

*Primary Examiner* — John J Lee
(74) *Attorney, Agent, or Firm* — Knobbe Martens Olson & Bear, LLP

(57) ABSTRACT

Systems and methods to accomplish a power control system in a MANET are described herein. To reduce detectability of the MANET, the controller 310 can reduce transmit power at individual links while operating the link's modulation and coding data rate and data queue backlog at levels that are sufficient to meet the user's offered load.

20 Claims, 8 Drawing Sheets

ADAPTIVE POWER CONTROL FOR MOBILE AD-HOC NETWORKS

CROSS-REFERENCE TO RELATED APPLICATIONS

This application is claims priority to U.S. Provisional App. No. 62/943,645, filed on Dec. 4, 2019, entitled "Adaptive Power Control For Mobile Ad-Hoc Network", the entire contents of which are incorporated by reference and made a part of this specification.

FIELD

This disclosure relates generally to communication systems and, more particularly, to power control in a Mobile Ad Hoc Network.

BACKGROUND

Wireless communication systems are widely deployed to provide various types of communication (e.g., voice, data, multimedia services, etc.) to multiple users. Such systems carry electronic signatures that may be detectable by third parties. Where users of a wireless communication system desire discretion with regard to the presence of the wireless communication system, the electronic signature can be problematic. However, reducing an electronic signature can result in reduced data rate between nodes on the network.

SUMMARY

For purposes of summarizing the disclosure, certain aspects, advantages and novel features have been described herein. It is to be understood that not necessarily all such advantages can be achieved in accordance with any particular embodiment disclosed herein. Thus, the embodiments disclosed herein can be embodied or carried out in a manner that achieves or optimizes one advantage or group of advantages as taught or suggested herein without necessarily achieving others.

A system for adapting power of a transmitter can include a memory; an antenna; a transmitter in communication with a receiver; and a hardware processor configured to: receive feedback from the receiver; determine a link queue region based on whether the value of the one or more transmitter link queue characteristics falls within a first range of values or a second range of values; select a power control function based on the receiver feedback and the link queue region; and modify a power level of the transmitter based on the power control function. The one or more link queue characteristics can include a link queue length. The one or more link queue characteristics can include a rate of change of the link queue length. The feedback can include information associated with an acknowledgement message. The hardware processor can be configured to modify a power level of the transmitter based on a receiver sensitivity. The receiver sensitivity can include sensitivity with respect to an RTS/CTS transmission. The receiver sensitivity can include a sensitivity with respect to a beacon transmission. The feedback can include information associated with a beacon message. The hardware processor can be configured to modify a power level based on a power level of beacon message transmissions. The hardware processor can be configured to modify a power level based on a signal to noise ratio (SNR) value of beacon messages received at a networking device transmitting the beacon messages. The SNR value can be used to determine routing information between one or more networking devices. The hardware processor can be configured to modify a power level based on a power level of beacon message transmissions. The hardware processor can be configured to modify a power level based on a signal to noise (SNR) value of beacon messages received at a networking device not transmitting the beacon messages.

A method of adapting power of a transmitter can include: receiving feedback from a receiver; determining a value of a transmitter link queue characteristic associated with a transmitter; determining a link queue region based on whether the value of the one or more transmitter link queue characteristics falls within a first range of values or a second range of values; selecting a power control function based on the receiver feedback and the link queue region; and modifying a power level of the transmitter based on the power control function. The one or more link queue characteristics can include link queue length. The one or more link queue characteristics can include rate of change of the link queue length. The feedback can include information associated with an acknowledgement message. Modifying a power level of the transmitter can be based on a receiver sensitivity. The receiver sensitivity can include sensitivity with respect to an RTS/CTS transmission. The receiver sensitivity can include a sensitivity with respect to a beacon transmission. The feedback can include information associated with a beacon message. Modifying a power level can be based on a signal to noise ratio (SNR) value of beacon messages received at a networking device transmitting the beacon messages. The SNR value can be used to determine routing information between one or more networking devices. Modifying a power level can be based on a power level of beacon message transmissions. Modifying a power level can be based on a signal to noise (SNR) value of beacon messages received at a networking device not transmitting the beacon messages.

A method for adapting power of a transmitter of a networking device can include receiving feedback from a receiver; determining a value of one or more transmitter link queue characteristics associated with a transmitter; and modifying a power level of the transmitter based on the feedback from the receiver and the one or more link queue characteristics. The feedback from the receiver can include at least one acknowledgement (ACK) messages. The one or more link queue characteristics can include at least one of: link queue length and rate of change of link queue length. The method can include selecting a power control function based on whether the value of the one or more transmitter link queue characteristics falls within a first range of values or a second range of values. Modifying the power level can include applying the power control function.

A method for controlling power of RTS/CTS transmissions in a wireless communication system can include: receiving one or more beacon messages at a receiver of a networking device configured to transmit RTS/CTS messages; analyzing the one or more beacon messages to determine one or more network characteristics; determining a performance characteristic of the receiver; and modifying a power level of the transmitter based on the performance characteristic of the receiver and the one or more network characteristics. The one or more network characteristics can include link signal to noise (SNR) values computed from beacon messages received from other networking devices at the networking device. The one or more network characteristics can include link SNR values of received beacon message transmissions at a networking device other than the network device configured to transmit the RTS/CTS messages. The link SNR values can be computed from beacon messages received from networking devices used to send information packets. The one or more network characteristics can include a power level of beacon message transmissions. The performance characteristic can include a power sensitivity of the radio receiver with respect to the RTS/CTS messages. The method can include selecting a power control function based on whether a value of the one or more network characteristics falls within a first range of values or a second range of values. Modifying the power level can include applying the power control function.

A method for controlling power of beacon message transmissions in a wireless communication system can include: receiving one or more beacon messages at a receiver of a networking device; analyzing the one or more beacon messages to determine one or more network characteristics; determining a performance characteristic of the receiver; and modifying a power level of the transmitter based on the performance characteristic of the receiver and the one or more network characteristics. The one or more network characteristics can include link signal to noise (SNR) values computed from beacon messages received from other networking devices at the networking device. The one or more network characteristics can include link SNR values of received beacon message transmissions at a networking device other than the network device configured to transmit the RTS/CTS messages. The one or more network characteristics can include a power level of beacon message transmissions. The performance characteristic can include a power sensitivity of the radio receiver with respect to the beacon transmissions. The method can include selecting a power control function based on whether a value of the one or more network characteristics falls within a first range of values or a second range of values. Modifying the power level can include applying the power control function.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

DETAILED DESCRIPTION

Figure 1:
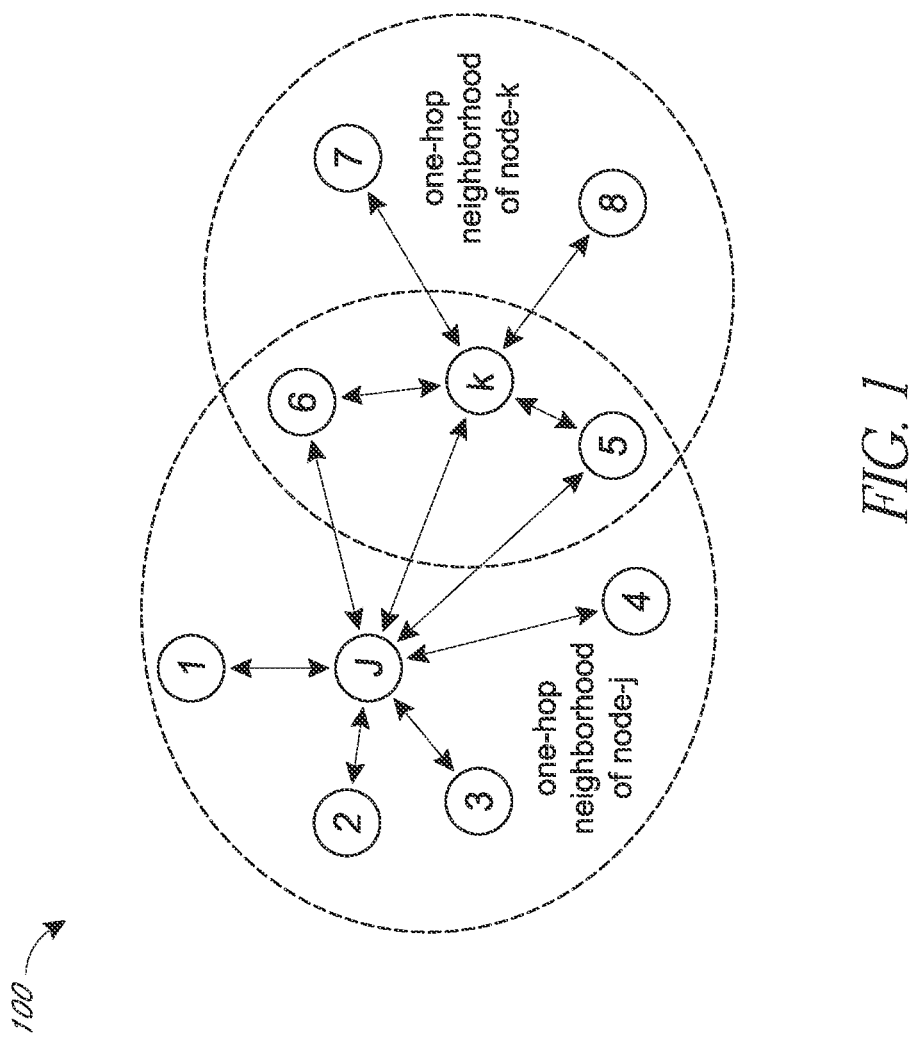
FIG. 1 illustrates an embodiment of a network system including multiple nodes or network devices for communicating data.

The presence of a wireless communication system can become known by third parties through the detection of an electronic network signature associated with the wireless communication system. For example, a wireless communication system, such as a mobile ad hoc network (MANET), can include a network of radios. Transmitting data between radios on the network requires a certain amount of transmit power for each radio. Data rate is a direct function of transmit power used on the link between radios. Thus, increased data rate may result in the need for greater transmit power. However, greater transmit power can result in a more detectable electronic signature. Thus, there can be a trade-off between reducing an electronic signature and providing sufficient data rates. Described herein are systems and methods for finding an optimized network electronic signature in the presence of different geometries of a wireless communication system, such as a mobile ad-hoc network.

A. Introduction

1. Mobile Ad-Hoc Network (MANET)

Networks that use cellular or WiFi technology may utilize a central 'hub' node to deliver high speed connectivity and good quality of service (QoS) to a user. Nodes may refer to any device or instrument with an antenna. However, the centralized control infrastructure may not be available in some environments. There are many instances where a network may operate with a group of nodes communicating with each other on an ad-hoc basis without centralized control. For example, in a military operation, it may not be ideal to set up an infrastructure with s centralized hub in a dynamic field setting where nodes may be coming in and out of the network. Furthermore, some environments may include jamming devices or interference sources that cannot be eliminated. Accordingly, removing the centralized hub and adding mobility, coupled with a time varying connectivity profile, without adversely affecting the user's QoS (Quality of Service) can be a formidable challenge faced by developers of wireless mesh networking (also called mobile ad hoc networking or MANET). A MANET system can include any group of mobile (or temporarily stationary) devices which may provide ability to stream voice, data, and video between arbitrary pairs of devices utilizing the others as relays to avoid the need for infrastructure.

2. Access Control Protocol

The nodes in a network may communicate over a shared medium or channel. Thus, transmission from one node may be received by all the other nodes in a neighborhood of the transmitting node. In some instances, the neighborhood can refer to all the nodes within one hop of the transmitting node. The size or the number of nodes included in the neighborhood can change based on network parameters which may include physical parameters, including but not limited to distance. Sending and receiving data on a shared channel at the same time can result in a collision and lost data. Thus, nodes in a network using a shared channel for communication between nodes implement a medium access control (MAC) protocol. Access control protocols can define rules for orderly access to the shared medium. Some examples of MAC protocols include CSMA/CA (carrier sense multiple access with collision avoidance), ALOHA or TDMA. The processes described herein can also work with other features associated with a networking device, such as Bluetooth, Push to Talk and other access control protocols.

Implementations of medium access control (MAC) protocols may vary depending on the type of protocol. However, a common characteristic of the MAC protocols is that only one pair of nodes communicate at any given time within a neighborhood of the pair of nodes. FIG. 1 illustrates a network system 100 including multiple nodes or networking devices communicating over a shared medium. In particular, FIG. 1 illustrates nodes in the one-hop neighborhood of the pair of nodes j and k. When node-j wants to communicate with node-k, the system 100 uses a MAC protocol, which may require all the nodes in the neighborhood of nodes j and k to be in a non-transmitting state. In other words, the neighboring nodes may be forced to wait until the transmission from node-j to node-k is complete. For example, in systems employing the CSMA/CA protocol, the neighborhood nodes of the transmitting node may operate in a non-transmitting state in response to a RTS (request to send) message. The term "non-transmitting state" is used in accordance with its broad and ordinary meaning herein, and it can refer to, for example, a state where a node is not transmitting in a particular channel, such as a primary channel. In the non-transmitting state, the node can transmit in channel other than the primary channels. In FIG. 1, 80% of the nodes are in a non-transmitting state during transmission from node-j to node-k. In addition, a majority of nodes may be in an idle backed-off state while waiting for the transmission between node-j and k to terminate.

3. Example Networking Device

Figure 2:
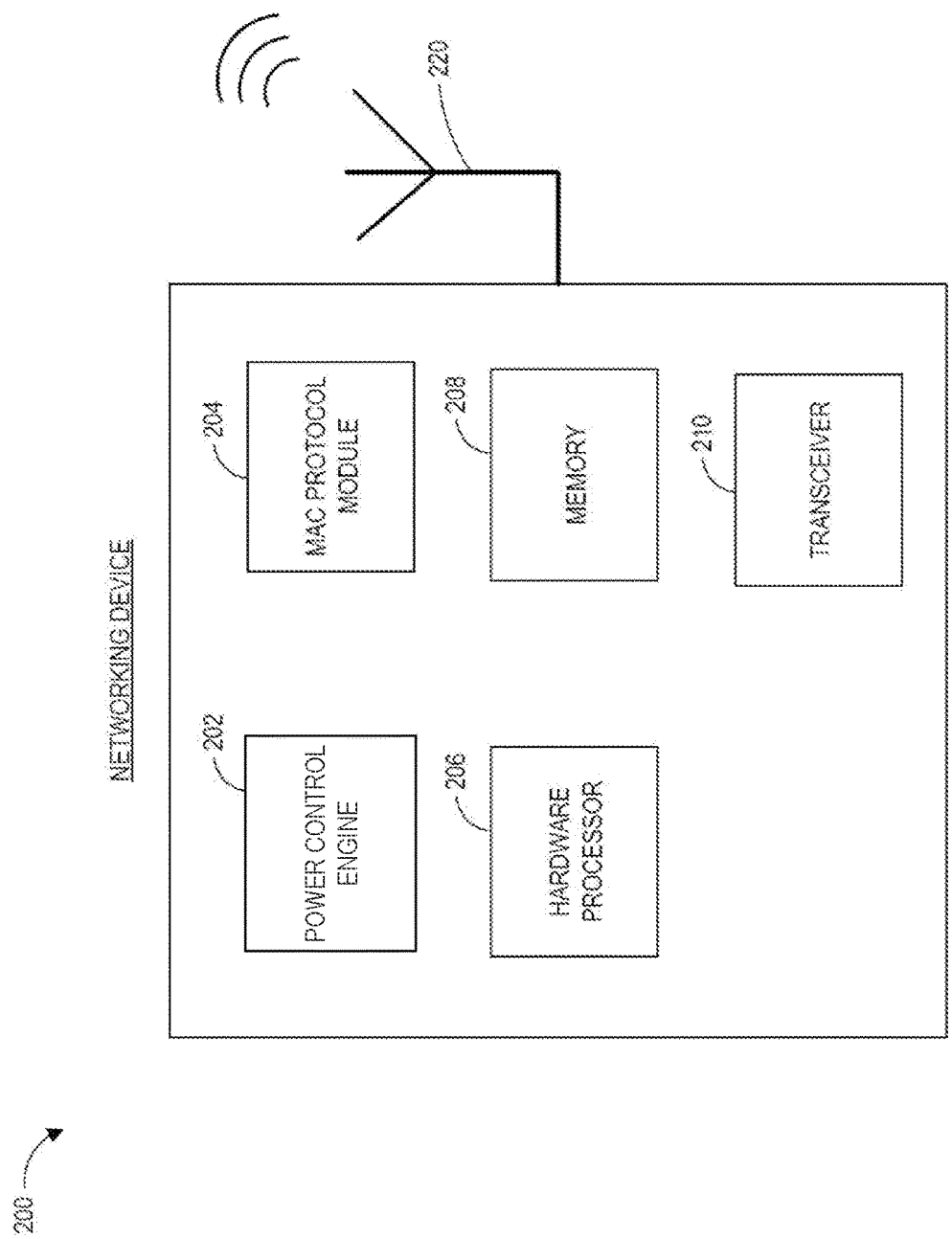
FIG. 2 illustrates an embodiment of a network device system including an antenna for receiving and transmitting data.

FIG. 2 illustrates an embodiment of a networking device 200 including a transceiver 210 and an antenna 220. The networking device 200 can form one of the nodes of a MANET as discussed above. In some embodiments, the networking device 200 can also be a part of a network that includes a centralized hub. The networking device 200 may include legacy radio devices. In some embodiments, the networking device 200 is a Rifleman Radio. In other embodiments, the networking device 200 is a radio that implements one or more of the Institute of Electrical and Electronics Engineers' (IEEE) 802.11 standards, such as, for example a "Wi-Fi" radio. A networking device that implements one or more such IEEE 802.11 standards will be referred to herein as a radio, system, protocol, or technology that has "WiFi." The networking device 200 can include a radio that uses Soldier Radio Waveform (SRW).

The networking device 200 includes a transceiver 210 for transmitting and/or receiving signals. In some embodiments, the networking device 200 can include more than one transceiver (not shown). For example, the networking device 200 may have separate transceivers for receiving and transmitting signals. In some embodiments, the networking device 200 can be a MIMO networking device. The embodiments of power control described herein can be used with any networking devices using MAC protocols to communicate over a shared medium.

The networking device 200 can include hardware and/or software modules. In the illustrated embodiment, the networking device 200 includes a hardware processor 206 and a memory 208. Further, the networking device 200 includes a power control engine module 202 and a MAC Protocol module 204. The power control engine 202 and the MAC protocol module 204 may be implemented in hardware or software or a combination of both. In some embodiments, the hardware processor 206 may execute the power control engine 202 and the MAC protocol module 204. Further, in some embodiments, the memory 208 can include instructions corresponding to the power control engine 203 and the MAC protocol module 204. For example, the memory 208 can store commands for operation of the networking device 200, such commands may include commands to change its channel, sense interference, broadcast the interference matrix. The memory 208 can also store channel lookup matrix with the corresponding states of the respective channel. For instance, the memory 208 can store the detected interference in different channels for each of the nodes of the network. The networking device 200 may also include additional modules not shown in the illustrated embodiment. For example, the networking device 200 may include a power source such as a battery.

The MAC protocol module 204 can implement one of the MAC protocols discussed above to communicate between network devices over a shared medium. In one embodiment, the MAC protocol module 204 implements a CSMA-CA protocol. The power control engine 202 can enable adaptive power control in the networking device 200. The power control engine 202 can work in conjunction with the MAC protocol module 204 to sense and transmit channel information. In some embodiments, the power control engine 202 can enable adaptive power control in legacy network devices without any hardware modification of the legacy network devices. For example, the power control engine 202 can enable adaptive power control in a networking device without requiring the networking device to include an additional or a dedicated transceiver. As discussed above, instructions for executing the power control engine 202 can be stored in a memory 208 of a networking device 200. Accordingly, in some instances, the power control engine 202 can enable adaptive power control in legacy network devices through software or a firmware update.

4. Controller

Figure 3:
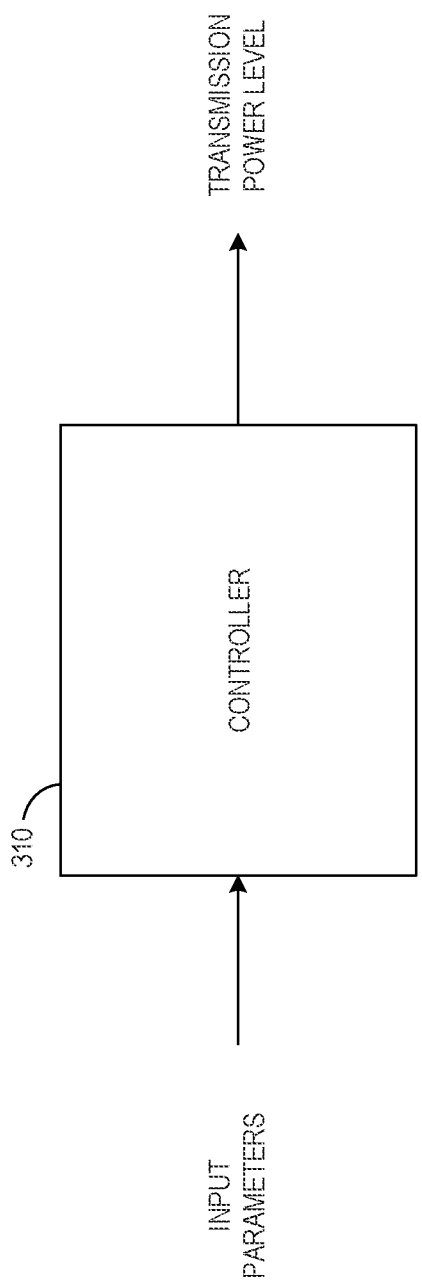
FIG. 3 illustrates a block diagram of an embodiment of a controller.

FIG. 3 illustrates a block diagram of an embodiment of a controller 310. The controller 310 can include one or more software engines for performing the process and functions described herein. The software engines can include programmed instructions for performing processes as discussed herein (and illustrated in flowcharts) for determining a transmission power based on one or more input parameters. The engines can be executed by the one or more hardware processors 206 of the networking device 200. The programming instructions can be stored in a memory 208. The programming instructions can be implemented in C, C++, JAVA, or any other suitable programming languages. In some embodiments, some or all of the portions of the controller 310 including the engines can be implemented in application specific circuitry such as ASICs and FPGAs. Some aspects of the functionality of the controller 310 can be executed remotely on a server (not shown) over a network. Accordingly, the controller 310 can be implemented with the hardware components described above with reference to FIGS. 1 and 2.

B. Adaptive Power Modulation and Coding Control

Rate of data transmission between radios may be correlated with transmit power. For example, increasing transmit power can increase data transmission rate. Conversely, lowering transmit power can reduce data transmission rate. Thus, where fast data rates between radios are desired, a system may increase transmit power for each radio on a network. However, increasing transmit power can result in a more detectable network, which may not be desirable. Thus, there exists a need to optimize transmit power to reduce an electronic network signature while maintaining sufficiently fast data rates.

However, power control (by, for example, link adaptation) is not easily attempted in a mobile ad-hoc network (MANET). A MANET system can include any group of mobile (or temporarily stationary) devices which may provide ability to stream voice, data, and video between arbitrary pairs of devices utilizing the others as relays to avoid the need for infrastructure. In a MANET, each link may have a different power level or power requirement. Additionally, in a MANET, there is not necessarily a direct relationship between network throughput and transmission quality. Thus, an overall power control scheme in a MANET is difficult to implement and can require link by link adaptation. Described herein are systems and methods to accomplish link by link power control in a MANET.

Some link adaptation schemes operate radios at a maximum transmit power and adapt each link's modulation and coding data rate to send packets at as high a data rate as possible, regardless of the user's offered traffic load. In contrast, to reduce detectability of the MANET, power control systems and methods described herein can help reduce transmit power per-link while operating the link's modulation and coding data rate and data queue backlog at levels that are sufficient to meet the user's offered load. Advantageously, the power control system described herein can upgrade a MANET's existing adaptive modulation and coding scheme with negligible increase in overhead of the waveform's media-access and link-establishment protocols. Additionally, the power control system can enable the MANET to operate in a wide variety of scenarios, such as in the presence of different geometries of the MANET and different offered loads to the MANET.

Systems and methods described herein can minimize an individual node's transmit power while supporting a desired quality of service (QoS). In some examples, the power control system may adapt the transmit power based on the loading/backlog of QoS queues in a radio on a network and on the perceived packet error rate (PER). If the QoS queues are not backlogged, then the node is supplying an appropriate data rate for the applications on the network and the transmit power can be lowered. If the QoS queues are getting backlogged, then the network needs a higher data rate from the node and higher data rate can be achieved with higher transmit power. Monitoring the backlog in QoS queues in the node is an appropriate metric for controlling the TX power level. Large queue backlog mandates a transmit power increase and small queue backlog implies that transmit power could be decreased. This approach can be advantageous over networks that use packet acknowledgements (ACKs) as the sole means to control rate and power. For example, in some examples of the system disclosed herein, the ACKs are used to signify that the power or modulation is in a bad state and high PER is currently being achieved. By using both the data queues in the radio and the packet acknowledgements (ACKs), power adaption may reach levels which provide near optimal electronic signature with respect to the network topology and the network offered load while still maintaining a desired quality of service.

1. Example Power Control Process

In some examples, a controller 310 can modify a transmit power in a wireless communication system according to a value of one or more characteristics associated with a networking device or wireless communication system. For example, a controller 310 can analyze one or more characteristics to generate one or more parameters associated with the one or more characteristics. The controller 310 may analyze the one or more parameters to determine a transmitter power level.

a. Queue Characteristic Analysis

Figure 4A:
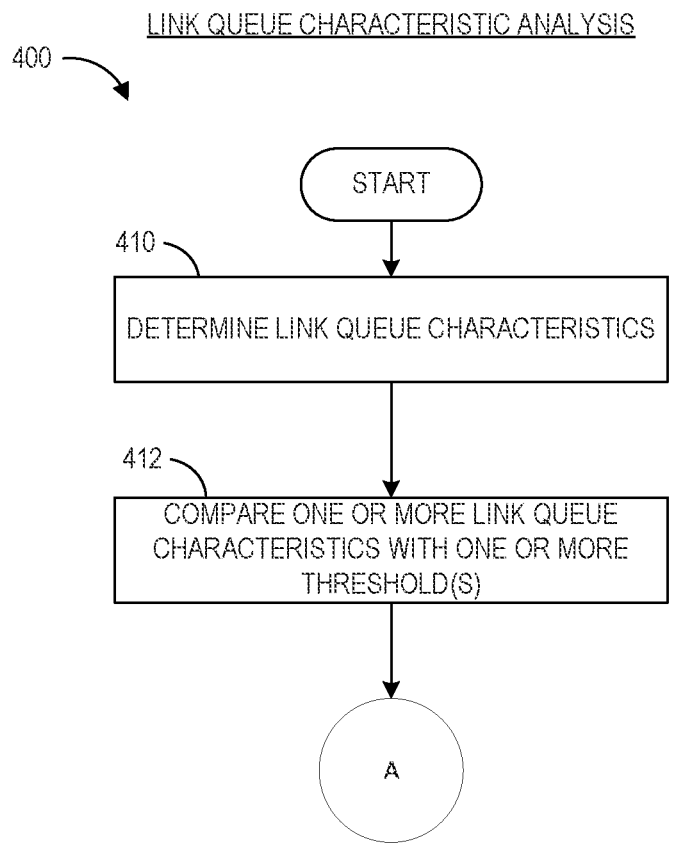
FIG. 4A illustrates a flow chart of an embodiment of a process for analyzing link queue characteristics.

FIG. 4A illustrates an example link queue characteristic analysis process 400 that may be implemented by a controller 310 for one or more queue characteristics, including but not limited to buffer queue length, rate of change of a queue, SNR level, or other value, such as one or more values associated with a buffer of a networking device.

At block 410, a controller 310 can determine one or more queue characteristics, such as one or more characteristics of a link between transmitting and receiving networking devices or a buffer queue at a transmitter. For example, the one or more characteristics can include a loading of the buffer, rate of change, other characteristics associated with a link involving the networking device or the networking device itself, some combination thereof or the like. The one or more characteristics can be determined by receiving information from one or more networking devices, through internal tracking of parameters, estimated or extracted from available information, some combination thereof, or the like.

At block 412, the controller 310 can determine a parameter associated with the one or more link queue characteristics. For example, to determine a parameter, the controller 310 can compare the one or more queue characteristics to one or more thresholds associated with the one or more queue characteristics. The controller 310 can determine an appropriate region associated with the link queue characteristic value and the one or more thresholds and select a parameter based on that region. In some examples, the parameter can include a power level, a control function for modifying the power level, a Boolean value associated with raising or lowering a power level, or other value associated with a power level or queue characteristic.

In some examples, the one or more ranges of values or thresholds associated with the one or more characteristics can include, but are not limited to buffer queue length, rate of change of buffer queue length, other characteristics associated with a networking device or link between networking devices, the like or some combination thereof. The controller 310 can determine one or more threshold values of the link queue characteristic within a total identified range of link queue characteristic values. The one or more threshold values can be static or dynamic. For example, a threshold may be predetermined by the networking device or a wireless communication system involving the networking device, determined based on user input, configured to change based on other parameters, learned by one or more hardware processors associated with the networking device or wireless communication system, the like, or some combination thereof.

In some examples, the controller 310 can partition the link queue characteristics based on the one or more threshold values into characteristic regions or states of network devices. For example, the one or more characteristics can be partitioned into a discrete number of regions or states. This partitioning can be accomplished by applying multiple thresholds to define one or more regions or states. Each region or state can be assigned a parameter or function for adapting transmit power and data rate. The parameter or function may be unique for each region or the same across two or more regions.

In one example, the controller 310 can partition a possible queue length into 3 regions based on two threshold values, such as a region below a first threshold, a region between the first and second threshold, and a region above the second threshold. For example, each link queue can have a maximum of 2048 number of packets, this queue may be divided into three regions by setting threshold values approximately equal to 350 and 650 packet queue length value, respectively. The controller 310 can make decision(s) for controlling power based on whether the link queue value falls into a region below the 350 threshold value, between the 350 and 650 threshold values, or above the 650 threshold value. The decision may be unique or the same for each region of values.

Advantageously, the choice of threshold may be selected to optimize user experience in terms of data rate. For example, the controller 310 may partition the regions into three such that there is a low amount of traffic or perceived traffic in the first region, there is a moderate amount of traffic or perceived traffic in the second region, and there is a large amount of traffic or perceived traffic in the third region. These regions may or may not be equal in size. For example, a threshold for a moderate amount of traffic may be greater than 350 out of 2048 packets and a threshold for a high amount of traffic may be 650 out of 2048 packets. Other threshold values and numbers of thresholds are also possible. For example, a system may have 1, 2, 3, 4, or more thresholds having different values for different numbers of total data packets.

Advantageously, the use of multiple thresholds can allow a wireless communication system to have greater flexibility in power control. For example, a system can monitor queues or other characteristics and set thresholds related to whether the queues are backlogged. If a queue is moderately backlogged, the controller 310 can increase the transmit power. However, if a queue is excessively backlogged, the controller 310 can maximize the transmit power to increase the data rate.

An output of the process 400 can include a parameter associated with a queue characteristic. In some examples, the output can then be used by the controller 310 to determine a power level for the transmitter, such as is discussed with reference to FIGS. 5 and 6. In some examples, a queue characteristic parameter is not used as the only parameter to determine a power level. In some examples, a queue characteristic parameter may be used in conjunction with a feedback characteristic parameter or other network parameter to determine a power level for a transmitter.

b. Receiver Feedback Analysis

Figure 4B:
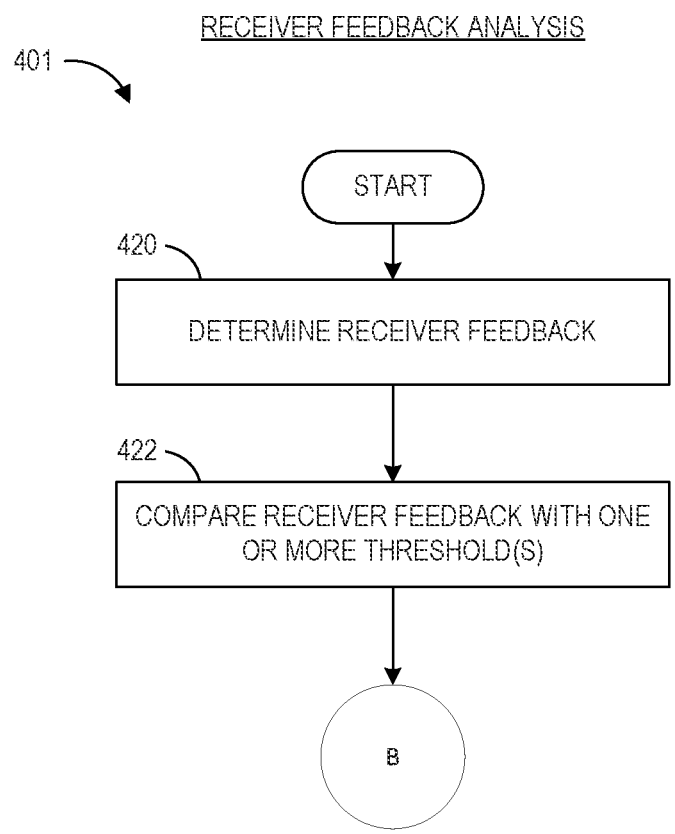
FIG. 4B illustrates a flow chart of an embodiment for analyzing receiver feedback characteristics.

FIG. 4B illustrates a flow chart of an embodiment of a process 401 for analyzing feedback from a receiver for use in determining a transmitter power.

At block 420, a controller 310 can determine information, such as one or more properties associated with a networking device in the wireless communication system based on feedback from a receiver. The feedback can include a packet error rate (PER), SNR value, or other performance value. The feedback can be determined from any number of sources, such as one or more acknowledgment messages (ACK) or other messages from the receiver. In other examples, the feedback can include information associated with one or more beacon messages, RTS/CTS transmission messages or other message transmissions received at the receiver.

At block 422, the controller 310 can determine a parameter associated with the feedback from the receiver. For example, to determine a parameter, the controller 310 can compare information associated with the receiver feedback with one or more threshold performance values. The controller 310 can compare the receiver feedback information to the one or more threshold values to determine an appropriate region associated with the feedback information and select a parameter based on that region. In some examples, the parameter can include an acknowledgement or signal that a receiver of a networking device is in a good or bad state or other value associated with the feedback information.

In some examples, the one or more ranges of values or thresholds associated with the feedback information can include a maximum allowable packet error rate, a minimum SNR value, other performance value, the like or some combination thereof. The controller 310 can determine one or more threshold values of the feedback information within a total identified range of values. The one or more threshold values can be static or dynamic. For example, a threshold may be predetermined by the networking device or a wireless communication system involving the networking device, determined based on user input, configured to change based on other parameters, learned by one or more hardware processors associated with the networking device or wireless communication system, the like, or some combination thereof. In some examples, the controller 310 can partition the values associated with the feedback information based on those threshold values into regions or states. For example, values associated with the feedback information can be partitioned into a discrete number of regions or states. This partitioning can be accomplished by applying multiple thresholds to define the regions.

Each region or state can be assigned a parameter or function for adapting transmit power and data rate. The parameter or function may be the same or different for each region or state. In some examples, an output of a parameter or function may include a feedback parameter associated with the selected region. For example, if the feedback information, such as a packet error rate, falls within an unacceptable region or state as signified by, for example, exceeding a threshold, such as a 40% maximum allowable packet error rate or the like, the controller may generate a feedback parameter that the networking device is in a bad state. If however, the feedback information falls within an acceptable region or state as signified by, for example, falling below threshold of maximum allowable error rate or the like, the controller may generate a feedback parameter that the networking device is in an acceptable state.

In some examples, there may be a single threshold value. For example, there may be a default threshold value associated with a maximum allowable packet error rate or other link queue characteristic. The default threshold value for a maximum allowable packet error rate may, for example, be set at any suitable value, such as 10%, 30%, 40%, 70%, or more or less. A default threshold value may be different for different link queue characteristics, such as for a minimum SNR value or another performance value. In some examples, a controller may modify the default threshold value based on user input. The user input may include a threshold value on a predetermined scale, such as 0% to 100%, 15% to 85%, 40% to 50%, or another range within 0% to 100%.

An output of the process 401 can include a parameter associated with the feedback information. In some examples, the output can then be used by the controller 310 to determine a power level for the transmitter, such as is discussed with reference to FIGS. 5 and 6. In some examples, a feedback parameter is not used as the only parameter to determine a power level. In some examples, a feedback parameter may be used in conjunction with a queue characteristic to determine a power level for a transmitter.

c. Network Characteristic Analysis

Figure 4C:
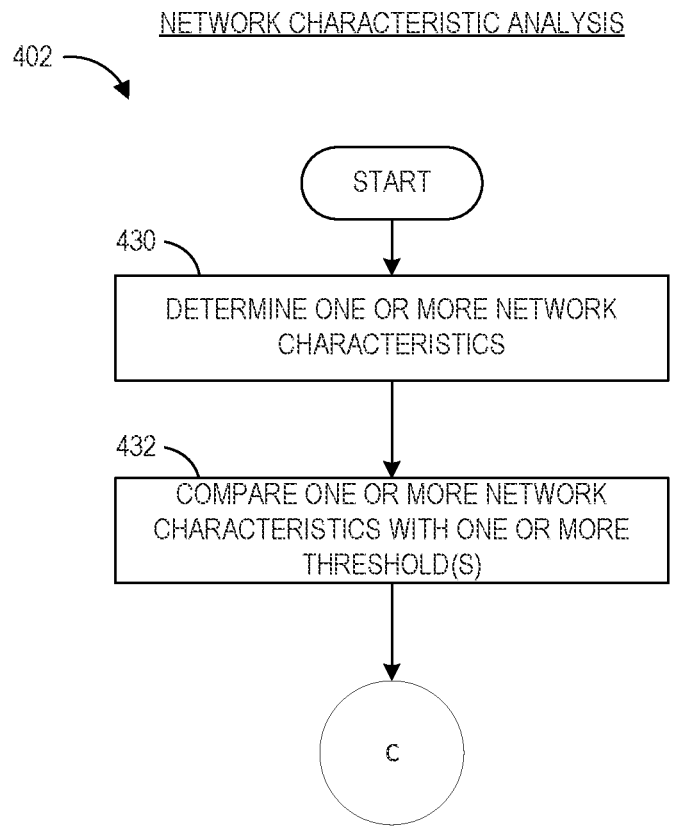
FIG. 4C illustrates a flow chart of an embodiment for analyzing network characteristics.

FIG. 4C illustrates an example network characteristic analysis process 402 that may be implemented by a controller 310 using a threshold for one or more network characteristics associated with one or more networking devices in a wireless communication system.

At block 430, a controller 310 can determine information associated with a network, one or more networking devices, or wireless communication system, such as number of transmitters or receivers active on the network, a network topology, security settings associated with the network, battery constraints of one or more nodes on the network, path changes between nodes on the network, the like or some combination thereof. The one or more characteristics can be determined by receiving information from other networking devices, through internal tracking of parameters on a networking device, estimated or extracted from available information, some combination thereof, or the like.

At block 432, the controller 310 can determine a network parameter associated with the one or more network characteristics. For example, to determine a network parameter, the controller 310 can compare the one or more network characteristics, such as a security level or parameter, to one or more thresholds associated with the one or more network characteristics. The controller 310 can compare the network characteristic to the one or more threshold values to determine an appropriate region associated with the network characteristic value and select a parameter based on that region. In some examples, the parameter can include a power level, a control function for modifying the power level, a Boolean value associated with raising or lowering a power level, or other value associated with a power level or network characteristic.

In some examples, the one or more ranges of values or thresholds associated with the one or more characteristics can include buffer queue length, rate of change of buffer queue length, other characteristics associated with a networking device or link between networking devices, the like or some combination thereof. The controller 310 can determine one or more threshold values of the network characteristic within a total identified range of network characteristic values. The one or more threshold values can be static or dynamic. For example, a threshold may be predetermined by the networking device or a wireless communication system involving the networking device, determined based on user input, configured to change based on other parameters, learned by one or more hardware processors associated with the networking device or wireless communication system, the like, or some combination thereof. In some examples, the device can have a threshold for a single characteristic. In some examples, there can be different thresholds for different characteristics, such as a threshold for a first characteristic and a threshold for a second characteristic. In some examples, the controller 310 can partition the network characteristics based on those threshold values into characteristic regions or states. For example, the one or more characteristics can be partitioned into a discrete number of regions or states. This partitioning can be accomplished by applying multiple thresholds to define the regions. Each region or state can be assigned a parameter or function specific to the region for adapting transmit power and data rate.

An output of the process 402 can include a parameter associated with the network characteristic. In some examples, the output can then be used by the controller 310 to determine a power level for the transmitter, such as is discussed with reference to FIGS. 5 and 6.

d. Example Power Control Architecture

Figure 5:
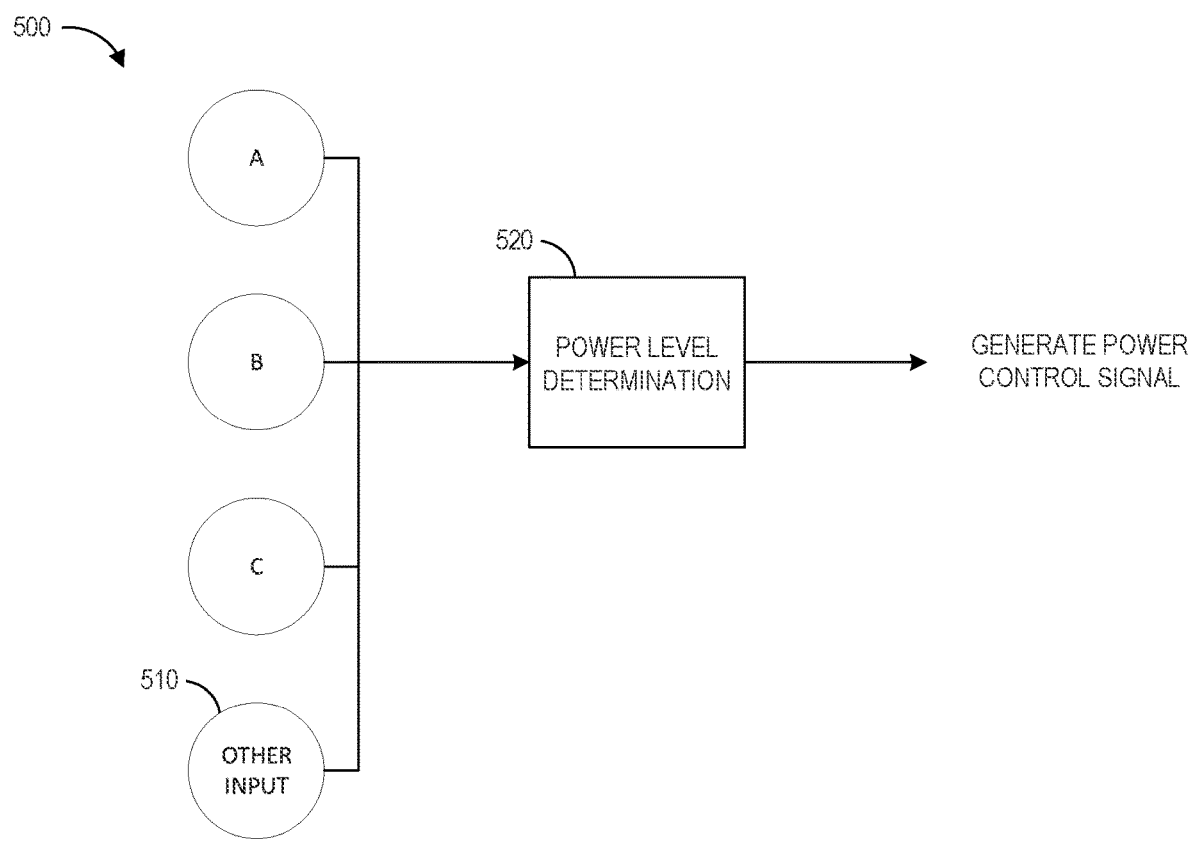
FIG. 5 illustrates an architecture for determination of a transmission power level using receiver feedback and link queue characteristics.

FIG. 5 illustrates an example architecture 500 for determination of a transmission power level using receiver feedback and link queue characteristics. For example, an architecture 500 can include inputs from process 400, process 401, process 402 and other input 510. At a block 520, the controller 310 can determine a power level and cause the system to generate a power control signal based on the determined power level.

The other input 510 can include associated with the wireless communication system or one or more networking devices associated with the wireless communication system. For example, the other input 510 can include additional receiver feedback information, such as a power sensitivity of the receiver receiving a message from the networking device. The controller 310 can utilize the power sensitivity to calculate and output an appropriate amount of power to maintain a certain level of receiver performance.

At block 510, the controller 310 can determine a power level. For example, a process 400 may have determined a parameter or control function based on a link queue characteristic. Additionally or alternatively, a process 401 may have determined a parameter or control function based on a receiver performance state. The controller 310 may apply decision logic to those inputs and other input 510 to determine a power level. For example, an output of a process 400 may indicate that a power level could be decreased by 10%. An output of a process 401 may indicate that a power level should not be decreased due to a high PER. The controller at block 620 may then determine that the power level should not be decreased. In another example, an output of a process 400 may indicate that a power level should be increased by 5%. An output of a process 401 may also indicate that a power level can be increased. The controller at block 620 may then determine that the power level should be increased by 5%.

To raise or lower transmit power, the controller 310 can modify one or more parameters that may result in increasing or decreasing transmit power associated with a networking device, such as the networking device 200 discussed with regard to FIG. 2. In some examples, the system may utilize one or more receiver characteristics to modify the transmit power. For example, the system may determine a receiver sensitivity. The system may utilize the receiver sensitivity to raise or lower the transmit power to maintain a certain measure of receiver performance.

e. Example Power Level Determination

Figure 6:
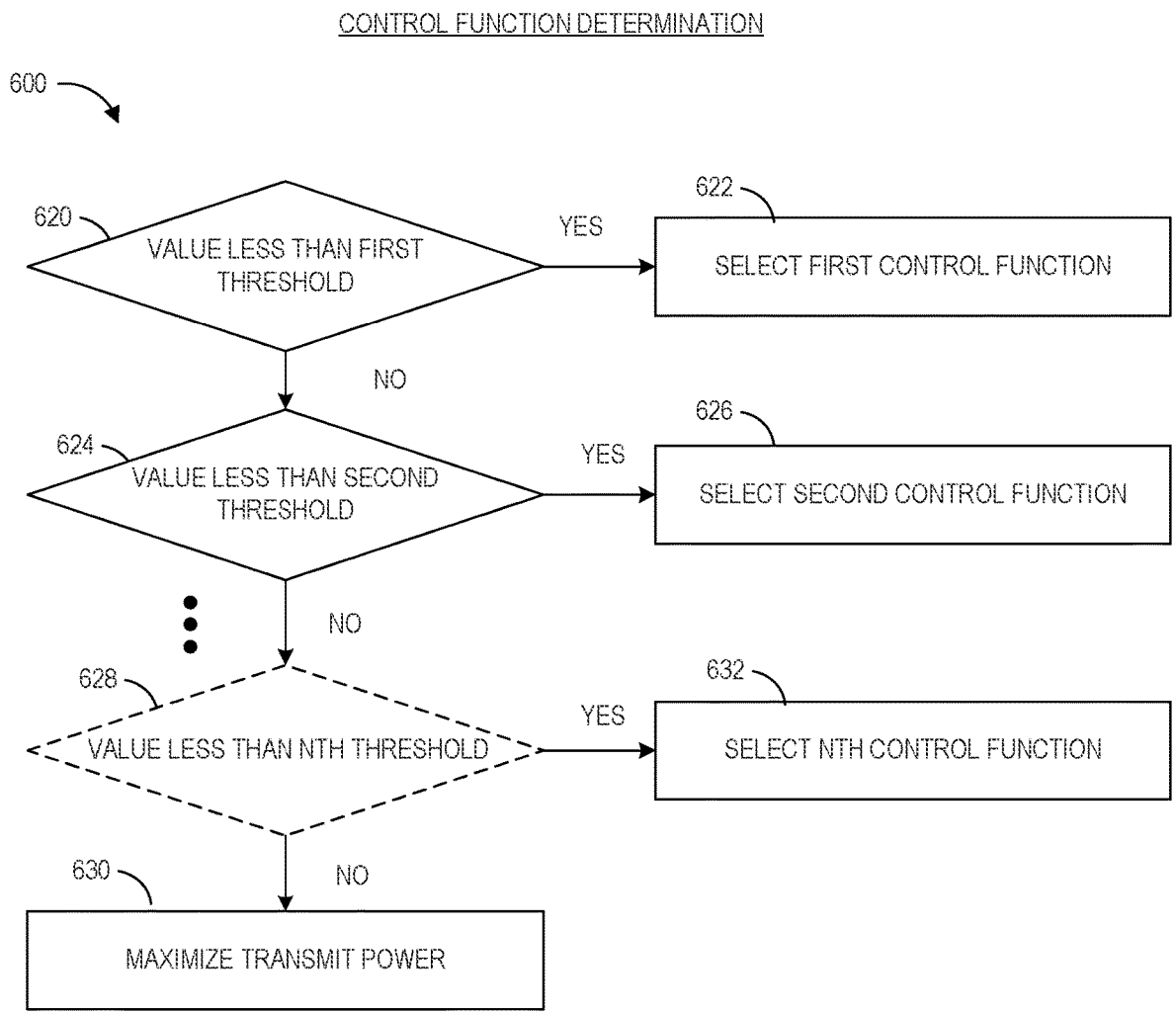
FIG. 6 illustrates a flow chart of an embodiment for determining a power level based on one or more network characteristic inputs.

FIG. 6 illustrates a flow chart of an embodiment of a process 600 for determining a control function for setting a transmitter power that may be implemented by the controller 310 as part of a power level determination 520 or other comparison processes described herein.

At block 620, the controller 310 can determine whether a value falls below a first threshold. For example, the value may be a parameter associated with a buffer queue length and the threshold may be a value of buffer queue length associated with a relatively low backlog or fast data rate. In another example, the value may be a parameter associated with a PER or other measurement of error associated with the link and the threshold may be a value associated with a relatively low error rate. If the value falls below the threshold then the controller 310 can select a first control function at block 622. If the value exceeds the threshold then the system moves on to block 624.

In some examples, the first control function selected at block 622 can include a function to modify transmitter power, such as lowering or raising transmitter power. For example, the first control function can lower a transmitter power to a predetermined minimum transmitter power. In another example, the first control function can lower a transmitter power as a function of a link queue value. In some examples, the controller 310 can modify the transmit power an incremental amount, such as 5%, 10%, 20% or another amount. In another example, the second control function can select a transmitter power as a function of a link queue value. In another example, the controller 310 can raise or lower the transmit power in accordance with a current level of the compared value. For example, system can apply a mathematical relationship between a value level and the desired transmit power to set the transmit power to a new level. Additionally or alternatively, the first control function can lower a transmitter power as a function of a receiver performance value or other receiver feedback, such as PER. For example, a controller may lower a transmitter power unless a PER or other measurement passes an allowable value.

At block 624, the controller 310 can determine whether a value is less than a second threshold. The second threshold can be different from the first threshold. For example, the second threshold can relate to the same value and be greater than the first threshold. In an example where the value includes a buffer queue length, the threshold can be a value of buffer queue length associated with a maximum allowable backlog or minimum data rate. If the value falls below the threshold then the controller 310 can select a first control function at block 626. If the value exceeds the threshold then the system moves on to the next block, for example block 628.

In some examples, the second control function selected at block 626 can include a function to modify transmitter power, such as lowering or raising transmitter power. The second control function can be different than the first control function. In some examples, the second control function can cause the controller 310 to select a transmitter power greater than would have been selected using the first control function. For example, the second control function can set a transmitter power to a predetermined transmitter power greater than a transmitter power associated with the first control function. In some examples, the controller 310 can modify the transmit power an incremental amount, such as 5%, 10%, 20% or another amount. In another example, the second control function can select a transmitter power as a function of a link queue value. In another example, the controller 310 can raise the transmit power in accordance with a current level of the compared value. For example, system can apply a mathematical relationship between a value level and the desired transmit power to set the transmit power to a new level. Additionally or alternatively, the second control function can select a transmitter power as a function of a receiver performance value or other receiver feedback, such as PER.

There may be any number of thresholds and comparison blocks. For example, the controller 310 can have N comparison blocks 628 associated with N thresholds. If a value falls within a range defined by one or more thresholds, the controller 310 can select an nth control function associated with that range at a block 632.

The nth control function can include one or more functions to modify a transmitter power, such as lowering or raising a transmitter power. The nth control function can be different than the first or second control functions. In some examples, the second control function can cause the controller 310 to select a transmitter power greater than would have been selected using the first control function. For example, the nth control function can set a transmitter power to a predetermined transmitter power greater than a transmitter power associated with the second control function. In some examples, the controller 310 can modify the transmit power an incremental amount, such as 5%, 10%, 20% or another amount. In another example, the nth control function can select a transmitter power as a function of a link queue value. In another example, the controller 310 can raise the transmit power in accordance with a current level of the compared value. For example, system can apply a mathematical relationship between a value level and the desired transmit power to set the transmit power to a new level. Additionally or alternatively, the nth control function can select a transmitter power as a function of a receiver performance value or other receiver feedback, such as PER.

Additionally or alternatively, if the value exceeds the threshold, then the controller 310 can set the transmit power to a set value, such as a maximum transmit power level, at block 630. Advantageously, raising the power level to a maximum level in response to exceeding the second threshold can allow the system to prioritize a property of the wireless communication system, such as data rate. Thus, if a value is, for example, a buffer queue length, then the controller 310 can maximize the transmit power when the buffer queue length becomes so backlogged as to cause inconvenience to a user of the wireless communication system. Thus, a user's data rate may be prioritized over limiting visibility of the network by reducing transmit power.

In some configurations, using both a link queue value and feedback from the receiver of a networking device can allow a wireless communication system to adapt power to provide near optimal electronic signature with respect to network topology and network offered load while still maintaining a desired QoS. For example, the controller 310 can use feedback from the receiver to act as a check on the power or modulation and signify that power or modulation is in a bad state and/or there is high PER.

2. Example Application of Power Control System

The adaptive power control process described herein may be implemented by a power control engine 202 to control power of many different transmissions in a MANET, such as transmission of data packets, control packets, or beacon packets.

For example, in application, the process can control power associated with RTS/CTS transmissions to maintain CSMA-CA MANET functionality. Data collisions can occur when two transmitters in a wireless communications system, such as a MANET, transmit at the same time. Carrier-Sense Multiple Access with Collision Avoidance (CSMA-CA) functionality is a method to avoid data collisions that uses carrier sensing. In CSMA-CA, networking devices wait to begin transmission when a channel is sensed to be idle in an attempt to avoid collisions. Networking devices can use Requests To Send/Clear To Send (RTS/CTS) messages as part of the collision avoidance. The process can adapt power at a networking device transmitting RTS/CTS messages based on data obtained from received beacon messages and on performance characteristics of the radio receiver.

In another application, the process can control power associated with the transmission of beacon messages. Beacon messages can be transmitted to one or more networking devices in a MANET. These beacon messages can help maintain neighbor discovery and route definition by transmitting information associated with the network to networking devices in the MANET. The process can adapt power at a networking device transmitting beacon messages based on data obtained from received beacon messages and on performance characteristics of the radio receiver. In another application, the process can control power associated with data packets transmitted to one or more networking devices in a MANET. Data packets can include actual data such as voice, video, and other kind of information which need to be transmitted from one networking device to another networking device in a MANET. The process can adapt power at a networking device transmitting data packets based on information associated with the data packets and/or on performance characteristics of the radio receiver, such as a packet error rate (PER).

In some examples, a networking device (such as a networking device 200 described with reference to FIG. 2) of a wireless communication system can receive one or more beacon messages. The beacon messages may be sent to one or more networking devices associated with the wireless communication system. A beacon message can include any amount of information associated with the wireless communication system or networking devices associated with the wireless communication system. For example, a beacon message can include link signal to noise ratio (SNR) values. The link SNR values can be computed from beacon messages received at a networking device transmitting a RTS/CTS message. Additionally or alternatively, the link SNR values can include SNR values of received beacon message transmissions at other networking devices on a network. In some examples, the link SNR values of received beacon message transmissions at other networking devices on the network can include routing information used to send information packets. In another example, a beacon message can include a power level of the beacon message transmissions.

The networking device can compare information from the beacon messages to a threshold. For example, in examples where the beacon messages include link SNR values, the controller 310 can determine whether the link SNR values exceed a threshold SNR value. If the threshold SNR value is exceeded, the device can attempt to reduce the link SNR values by decreasing transmitter power at block. Additionally, the networking device can determine one or more performance characteristics of the radio receiver. For example, the performance characteristic can be a power sensitivity of the radio receiver with respect to RTS/CTS transmissions or beacon transmissions. The networking device can modify transmit power based on feedback from the receiver. For example, in examples where the performance characteristic includes a power sensitivity of the receiver, the controller 310 can utilize the power sensitivity to calculate and output an appropriate amount of power.

C. Additional Aspects

Disclosed herein are additional aspects of adaptive power control systems and methods.

In a first Aspect, a system for adapting power of a transmitter in a mobile ad hoc network, the system comprising:
 a memory;
 an antenna;
 a transmitter in communication with a receiver; and
 a hardware processor configured to:
 receive feedback from the receiver;
 determine a value of one or more transmitter link queue characteristics associated with the transmitter;
 determine a link queue region based on whether the value of the one or more transmitter link queue characteristics falls within a first range of values or a second range of values;
 select a power control function based on the receiver feedback and the link queue region; and
 modify a power level of the transmitter based on the power control function.

In a second Aspect, the system of Aspect 1, wherein the one or more link queue characteristics comprises link queue length.

In a third Aspect, the system of Aspects 1 or 2, wherein the one or more link queue characteristics comprises rate of change of the link queue length.

In a fourth Aspect, the system of any of the Aspects above, wherein the feedback comprises information associated with an acknowledgement message.

In a fifth Aspect, the system of any of the Aspects above, wherein the hardware processor is configured to modify a power level of the transmitter based on a receiver sensitivity.

In a sixth Aspect, the system of any one of Aspects 1-5, wherein the receiver sensitivity comprises sensitivity with respect to an RTS/CTS transmission.

In a seventh Aspect, the system of any one of Aspects 1-5, wherein the receiver sensitivity comprises a sensitivity with respect to a beacon transmission.

In an eight Aspect, the system of any of the Aspects above, wherein the feedback comprises information associated with a beacon message.

In a ninth Aspect, the system of any of the Aspects above, wherein the hardware processor is configured to modify a power level based on a signal to noise ratio (SNR) value of beacon messages received at a networking device transmitting the beacon messages.

In a tenth Aspect, the system of any of the Aspects above, wherein the SNR value are used to determine routing information between one or more networking devices.

In a eleventh Aspect, the system of any of the Aspects above, wherein the hardware processor is configured to modify a power level based on a power level of beacon message transmissions.

In a twelfth Aspect, the system of any of the Aspects above, wherein the hardware processor is configured to modify a power level based on a signal to noise (SNR) value of beacon messages received at a networking device not transmitting the beacon messages.

In a thirteenth Aspect, a method of adapting power of a transmitter, the method comprising:
 receiving feedback from a receiver;
 determining a value of a transmitter link queue characteristic associated with a transmitter;
 determining a link queue region based on whether the value of the one or more transmitter link queue characteristics falls within a first range of values or a second range of values;
 selecting a power control function based on the receiver feedback and the link queue region; and
 modifying a power level of the transmitter based on the power control function.

In a fourteenth Aspect, the method of Aspect 13, wherein the one or more link queue characteristics comprises link queue length.

In a fifteenth Aspect, the method of Aspects 13 or 14, wherein the one or more link queue characteristics comprises rate of change of the link queue length.

In a sixteenth Aspect, the method of any one of Aspects 13-15, wherein the feedback comprises information associated with an acknowledgement message.

In a seventeenth Aspect, the method of any one of Aspects 13-16, wherein modifying a power level of the transmitter is based on a receiver sensitivity.

In an eighteenth Aspect, the method of any one of Aspects 13-17, wherein the receiver sensitivity comprises sensitivity with respect to an RTS/CTS transmission.

In a nineteenth Aspect, the method of any one of Aspects 13-18, wherein the receiver sensitivity comprises a sensitivity with respect to a beacon transmission.

In a twentieth Aspect, the method of any one of Aspects 13-19, wherein the feedback comprises information associated with a beacon message.

In a twenty first Aspect, the method of any one of Aspects 13-20, wherein modifying a power level is based on a signal to noise ratio (SNR) value of beacon messages received at a networking device transmitting the beacon messages.

In a twenty second method of any one of Aspects 13-21, wherein the SNR value are used to determine routing information between one or more networking devices.

In a twenty third Aspect, the method of any one of Aspects 13-22, wherein modifying a power level is based on a power level of beacon message transmissions.

In a twenty fourth Aspect, the method of any one of Aspects 13-23, wherein modifying a power level is based on a signal to noise (SNR) value of beacon messages received at a networking device not transmitting the beacon messages.

In a twenty fifth Aspect, A method for adapting power of a transmitter of a networking device comprising
receiving feedback from a receiver;
determining a value of one or more transmitter link queue characteristics associated with a transmitter; and
modifying a power level of the transmitter based on the feedback from the receiver and the one or more link queue characteristics.

In a twenty sixth Aspect, the method of Aspect 25 wherein the feedback from the receiver comprises at least one acknowledgement (ACK) messages.

In a twenty seventh Aspect, the method of any one of Aspects 25-26, wherein the one or more link queue characteristics comprises at least one of: link queue length and rate of change of link queue length.

In a twenty eighth Aspect, the method of any one of Aspects 25-27 comprising: selecting a power control function based on whether the value of the one or more transmitter link queue characteristics falls within a first range of values or a second range of values.

In a twenty ninth Aspect, the method of Aspect 28 wherein modifying the power level comprises applying the power control function.

In a thirtieth Aspect, the method for controlling power of RTS/CTS transmissions in a wireless communication system comprising:
receiving one or more beacon messages at a receiver of a networking device configured to transmit RTS/CTS messages;
analyzing the one or more beacon messages to determine one or more network characteristics;
determining a performance characteristic of the receiver; and
modifying a power level of the transmitter based on the performance characteristic of the receiver and the one or more network characteristics.

In a thirty first Aspect, the method of Aspect 30, wherein the one or more network characteristics comprises link signal to noise (SNR) values computed from beacon messages received from other networking devices at the networking device.

In a thirty second Aspect, the method of any one of Aspects 30 or 31, wherein the one or more network characteristics comprises link SNR values of received beacon message transmissions at a networking device other than the network device configured to transmit the RTS/CTS messages.

In a thirty third Aspect, the method of any one of Aspects 30-32, wherein the link SNR values are computed from beacon messages received from networking devices used to send information packets.

In a thirty fourth Aspect, the method of any one of Aspects 30-33, wherein the one or more network characteristics comprises a power level of beacon message transmissions.

In a thirty fifth Aspect, the method of any one of Aspects 30-34, wherein the performance characteristic comprises a power sensitivity of the radio receiver with respect to the RTS/CTS messages.

In a thirty sixth Aspect, the method of any one of Aspects 30-35, comprising selecting a power control function based on whether a value of the one or more network characteristics falls within a first range of values or a second range of values.

In a thirty seventh Aspect, the method of Aspect 36, wherein modifying the power level comprises applying the power control function.

In a thirty eighth Aspect, the method for controlling power of beacon message transmissions in a wireless communication system comprises:
receiving one or more beacon messages at a receiver of a networking device;
analyzing the one or more beacon messages to determine one or more network characteristics;
determining a performance characteristic of the receiver; and
modifying a power level of the transmitter based on the performance characteristic of the receiver and the one or more network characteristics.

In a thirty ninth Aspect, the method of Aspect 38, wherein the one or more network characteristics comprises link signal to noise (SNR) values computed from beacon messages received from other networking devices at the networking device.

In a fortieth Aspect, the method of any one of Aspects 38 or 39, wherein the one or more network characteristics comprises link SNR values of received beacon message transmissions at a networking device other than the network device configured to transmit the RTS/CTS messages.

In a forty first Aspect, the method of any one of Aspects 38-40, wherein the one or more network characteristics comprises a power level of beacon message transmissions.

In a forty second Aspect, the method of any one of Aspects 38-41, wherein the performance characteristic comprises a power sensitivity of the radio receiver with respect to the beacon transmissions.

In a forty third Aspect, the method of any one of Aspects 38-42 comprising selecting a power control function based on whether a value of the one or more network characteristics falls within a first range of values or a second range of values.

In a forty fourth Aspect, the method of Aspect 43, wherein modifying the power level comprises applying the power control function.

In a forty fifth Aspect, an algorithm that achieves MANET link transmitter power and data rate control or adaptation based on the transmitter link queue characteristics and feedback from the receiver.

In a forty sixth Aspect, an algorithm as described in Aspect 45, where feedback from the receiver is ACK messages fed back from the receiver.

In a forty seventh Aspect, an algorithm as described in Aspect 45, where link queue characteristics are the link queue length and the rate of change of the link queue length.

In a forty eighth Aspect, an algorithm as described in Aspect 47, where the link queue length and the rate of change of the link queue length is partitioned into a finite number of regions or "states" and different control functions in each region is used to adapt transmit power and data rate.

In a forty ninth Aspect, an algorithm that controls the power of the RTS/CTS transmissions to maintain the CSMA-CA MANET functionality based on data obtain in reception of and information contained within the beacon messages received at each node transmitting the RTS/CTS and the performance characteristics of the radio receiver.

In a fiftieth Aspect, an algorithm as described in Aspect 49, where feedback from beacons includes link SNR values computed from beacon messages received from other nodes at the node transmitting the RTS/CTS.

In a fifty first Aspect, an algorithm as described in Aspect 49, where feedback from beacon messages includes the SNR of received beacon message transmissions at other nodes.

In a fifty second Aspect, an algorithm as described in Aspect 51, where link SNR values computed from beacon messages received from other nodes provides the routing information used to send information packers In a fifty third Aspect, an algorithm as described in Aspect 49, where feedback from beacon messages includes the power level of the beacon message transmissions In a fifty fourth Aspect, an algorithm as described in Aspect 49, where the performance characteristic of the radio receiver is the power sensitivity of the radio receiver with respect to the RTS/CTS transmissions.

In a fifty fifth Aspect, an algorithm to control the power of network beacon messages transmitted at each node to maintain the desired neighbor discovery and route definition MANET functionality based on data obtain in reception and feedback within the beacon messages received at each node and the performance characteristics of the radio receiver.

In a fifty sixth Aspect, an algorithm as described in Aspect 55, where feedback from beacons includes link SNR values computed from beacon messages received from other nodes at the node transmitting the beacon message.

In a fifty seventh Aspect, an algorithm as described in Aspect 55, where feedback from beacon messages includes the SNR of received beacon message transmissions at other nodes.

In a fifty eighth Aspect, an algorithm as described in Aspect 55, where feedback from beacon messages includes the power level of the beacon message transmissions In a fifty ninth Aspect, an algorithm as described in Aspect 55, where the performance characteristic of the radio receiver is the power sensitivity of the radio receiver with respect to the beacon transmissions.

Any of the above aspects may be combined.

D. Terminology

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for adapting power of a transmitter in a mobile ad hoc network, the system comprising:
   a memory;
   an antenna;
   the transmitter in communication with a receiver; and
   a hardware processor configured to:
   receive feedback from the receiver;
   determine a value of one or more transmitter link queue characteristics associated with the transmitter;
   determine a link queue region based on whether the value of the one or more transmitter link queue characteristics falls within a first range of values or a second range of values;
   select a power control function based on the received feedback and the link queue region; and
   modify a power level of the transmitter based on the power control function.

2. The system of claim 1, wherein the one or more link queue characteristics comprises at least one of: link queue length or rate of change of link queue length.

3. The system of claim 1, wherein the feedback comprises information associated with an acknowledgement message.

4. The system of claim 1, wherein the hardware processor is configured to modify a power level of the transmitter based on a receiver sensitivity.

5. The system of claim 4, wherein the receiver sensitivity comprises: sensitivity with respect to an RTS/CTS transmission or sensitivity with respect to a beacon transmission.

6. The system of claim 1, wherein the feedback comprises information associated with a beacon message.

7. The system of claim 6, wherein the hardware processor is configured to modify a power level based on a signal to noise ratio (SNR) value of beacon messages received at a networking device transmitting the beacon messages.

8. The system of claim 7, wherein the SNR value are used to determine routing information between one or more networking devices.

9. The system of claim 6, wherein the hardware processor is configured to modify a power level based on a power level of beacon message transmissions.

10. The system of claim 6, wherein the hardware processor is configured to modify a power level based on a signal to noise (SNR) value of beacon messages received at a networking device not transmitting the beacon messages.

11. A method of adapting power of a transmitter, the method comprising:
    receiving feedback from a receiver;
    determining a value of the transmitter link queue characteristic associated with a transmitter;
    determining a link queue region based on whether a value of the one or more transmitter link queue characteristics falls within a first range of values or a second range of values;
    selecting a power control function based on the received feedback and the link queue region; and
    modifying a power level of the transmitter based on the power control function.

12. The method of claim 11, wherein the one or more link queue characteristics comprises at least one of: link queue length or rate of change of the link queue length.

13. The method of claim 11, wherein the feedback comprises information associated with an acknowledgement message.

14. The method of claim 11, wherein modifying a power level of the transmitter is based on a receiver sensitivity.

15. The method of claim 14, wherein the receiver sensitivity comprises: sensitivity with respect to an RTS/CTS transmission or sensitivity with respect to a beacon transmission.

16. The method of claim 11, wherein the feedback comprises information associated with a beacon message.

17. The method of claim 16, wherein modifying a power level is based on a signal to noise ratio (SNR) value of beacon messages received at a networking device transmitting the beacon messages.

18. The method of claim 17, wherein the SNR value are used to determine routing information between one or more networking devices.

19. The method of claim 16, wherein modifying a power level is based on a power level of beacon message transmissions.

20. The method of claim 16, wherein modifying a power level is based on a signal to noise (SNR) value of beacon messages received at a networking device not transmitting the beacon messages.

* * * * *